United States Patent
Garrett et al.

(10) Patent No.: US 6,724,834 B2
(45) Date of Patent: Apr. 20, 2004

(54) THRESHOLD DETECTOR FOR DETECTING SYNCHRONIZATION SIGNALS AT CORRELATOR OUTPUT DURING PACKET ACQUISITION

(76) Inventors: Albert L. Garrett, 2370 Shady Oak Rd., Melbourne, FL (US) 32935; Keith R. Baldwin, 1903 Redwood Ave., Melbourne Beach, FL (US) 32951

(*) Notice: Subject to any disclaimer, the term of this patent is extended or adjusted under 35 U.S.C. 154(b) by 220 days.

(21) Appl. No.: 10/081,045

(22) Filed: Feb. 22, 2002

(65) Prior Publication Data

US 2003/0161428 A1 Aug. 28, 2003

(51) Int. Cl.[7] .............................................. H04L 25/10
(52) U.S. Cl. ...................................... 375/317; 375/150
(58) Field of Search ................................ 375/137, 142, 375/143, 145, 149, 150, 152, 317, 343, 349

(56) References Cited

U.S. PATENT DOCUMENTS

| | | | |
|---|---|---|---|
| 4,227,055 A | | 10/1980 | Hanson |
| 4,385,208 A | | 5/1983 | Tow |
| 4,811,389 A | * | 3/1989 | Balch ........................ 379/377 |
| 5,752,190 A | * | 5/1998 | Kaewell et al. ............ 455/436 |
| 6,094,449 A | * | 7/2000 | Komatsu .................... 375/136 |

FOREIGN PATENT DOCUMENTS

EP  1 126 673 A2  8/2001

OTHER PUBLICATIONS

PCT Notification of Transmittal of the International Search Report or the Declaration dated Apr. 16, 2003, 6 pages.

* cited by examiner

Primary Examiner—Stephen Chin
Assistant Examiner—Kevin Kim
(74) Attorney, Agent, or Firm—Gary R. Stanford

(57) ABSTRACT

A threshold detector for detecting synchronization signals at correlator output during packet acquisition. An RF receiver converts RF signals into baseband signals. A matched filter correlator correlates samples of the baseband signals with predetermined synchronization signals, such as long sync symbols, and provides corresponding correlation samples. A long-term integrator integrates a first predetermined number of the correlation samples to provide a long term moving average and a short term integrator integrates a second predetermined number of the correlation samples to provide a short term moving average signal. The short term moving average signal is based on channel delay spread and the long term moving average tracks channel noise. A multiplier multiplies the long term moving average signal by a scale factor to generate a dynamic threshold. A detector detects a crossover between the short term moving average and the dynamic threshold to estimate timing of received synchronization signals.

20 Claims, 6 Drawing Sheets

THRESHOLD DETECTOR FOR DETECTING SYNCHRONIZATION SIGNALS AT CORRELATOR OUTPUT DURING PACKET ACQUISITION

FIELD OF THE INVENTION

The present invention relates to wireless communications, and more particularly to a dynamic threshold detector that enables more accurate detection of synchronization signals of transmitted packets to achieve more successful packet timing estimation.

BACKGROUND OF THE INVENTION

In packet radio systems, transmitted packets typically consist of preamble and data payload. The wireless receiver uses the preamble to determine timing and process the data payload. Typically, timing estimation is achieved by correlating for a predetermined preamble sequence and detecting correlation via crossing of a threshold. The preamble sequences may be referred to as synchronization signals that are pre-pended to the packet prior to transmission. For an orthogonal frequency division multiplexing (OFDM) configuration according to the Institute of Electrical and Electronics Engineers, Inc. (IEEE) 802.11a standard, for example, a pair of predetermined long sync (LS) symbols are used as the preamble sequence. Several issues associated with threshold detection include threshold crossing at the correct time position, threshold crossing at an incorrect time position, and no threshold crossing.

In a multipath environment, preamble correlation is spread over several output samples so that the correlation peak is smaller. In general, the transmitted signal traverses multiple paths to the receiver resulting in an interference pattern that obscures the results of the correlation process. The correlation process operating in the multipath environment exhibiting a multipath delay profile results in multiple attenuated decaying peaks rather than one strong peak. A single, constant threshold value used to distinguish correlation peaks from noise is inadequate to achieve desired performance levels. A constant threshold value optimized for Additive White Gaussian Noise (AWGN) increases the occurrence of "miss events" since the threshold must be set at a relatively high level that is greater than the more attenuated correlation events. A smaller threshold used for correlation detection catches the weaker signals but also increases the occurrence of false alarms. Furthermore, the characteristics of the wireless medium changes from one environment to another, so that the noise level and/or multipath delay profile may also vary. These factors may further change over time in a given environment, such as movement of interfering elements or periodic activation/deactivation of interfering communication devices. A single, constant threshold is inadequate to detect correlation peaks in the face of all of these potential contingencies thereby resulting in poor and/or variable performance levels.

The receiver typically performs automatic gain control (AGC) functions to control the power of received signals to a target power level to detect and acquire both strong and weak signals. AGC errors also significantly impact performance, particularly for radios employing a constant correlation detection threshold. AGC errors of positive or negative 3 decibels (dB) are typically expected. Negative AGC errors reduce the correlation peak and increase miss events. Positive AGC errors enhance noise level and increase false alarm events. The OFDM preamble has relatively high (poor) cross-correlation properties, which increases false alarm events. It is appreciated that the performance of the radio transceiver is very sensitive to the thresholding technique employed. It is desired to find a thresholding technique that enables relatively high performance levels regardless of environment, multipath and AGC discrepancies.

SUMMARY OF THE INVENTION

A threshold detector for a wireless receiver according to an embodiment of the present invention is configured to detect synchronization signals of packets transmitted in a wireless medium. The detector includes a correlator, short-term and long-term integrators, a multiplier and a detector. The correlator compares received signals with predetermined synchronization signals and provides a correlation signal indicative thereof. The short-term integrator integrates a predetermined short term of the correlated signal and provides a short term moving average signal. The long-term integrator integrates a predetermined long term of the correlated signal and provides a long term moving average signal. The multiplier multiplies the long term moving average signal by a predetermined constant and provides a dynamic threshold signal. The detector asserts a timing signal based on a crossover between the short term moving average signal and the dynamic threshold signal.

The detector may include phase removal logic that removes phase of the correlation signal. The correlator may be configured to output a consecutive series of samples at a selected sample rate of the received signal as the correlation signal. In this case, the short-term integrator determines a moving average using a first predetermined number of samples based on a predetermined channel delay spread. The long-term integrator determines a moving average using a second predetermined number of samples selected to track noise level in the channel. The second predetermined number is greater than the first predetermined number so that the short term moving average signal is more responsive to correlation fluctuations.

The threshold detector may be used as a synchronization timing estimator in a baseband processor used for wireless packet-based communications, such as those used for WLAN applications. In an orthogonal frequency division multiplexing (OFDM) embodiment, for example, the threshold detector comprises timing estimation logic used to estimate the timing of long sync symbols in the preamble of OFDM packets.

BRIEF DESCRIPTION OF THE DRAWINGS

A better understanding of the present invention can be obtained when the following detailed description of the preferred embodiment is considered in conjunction with the following drawings, in which:

FIG. 4 is a timing diagram illustrating an exemplary preamble structure of an OFDM packet configured according to IEEE 802.11a.

DETAILED DESCRIPTION OF EMBODIMENT(S) OF THE INVENTION

Figure 1:
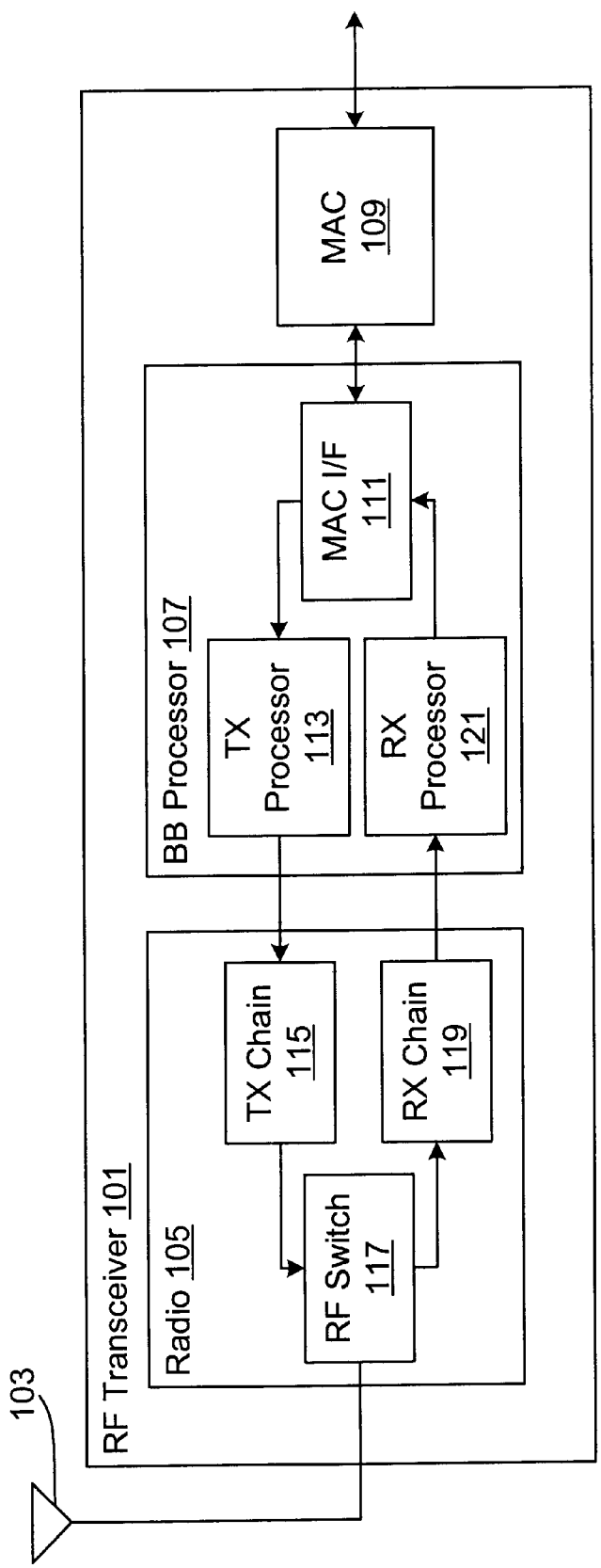
FIG. 1 is a block diagram of a wireless radio frequency (RF) transceiver implemented according to an embodiment of the present invention.

FIG. 1 is a block diagram of a wireless radio frequency (RF) transceiver 101 implemented according to an embodiment of the present invention. The transceiver 101 may be used to communicate with one or more similar wireless devices across a wireless medium, such as within a wireless local area network (WLAN) or the like. Although the present invention is illustrated for use in a WLAN device in exemplary embodiments, it is understood that the present invention applies to any radio or wireless communication device and is not limited to WLAN applications. The transceiver 101 may be used by any type of device to incorporate wireless communication capabilities, such as a wireless access point (AP), any type of computer or computer system (e.g., personal computers, laptop computers, desktop computers, etc.,), printing devices including any type of printer technology, personal digital assistants (PDAs) or the like, scanners, fax machines, etc.

The transceiver 101 may be configured as a plug-in peripheral or expansion card that plugs into an appropriate slot or interface of a computer system, such as a Personal Computer Memory Card International Association (PCMCIA) card or PC Card or may be implemented according to any type of expansion or peripheral standard, such as according to the peripheral component interconnect (PCI), the Industry Standard Architecture (ISA), the Extended-ISA (EISA) standard, etc. Mini PCI cards with antennas embedded in displays are also contemplated. Self-contained or standalone packaging with appropriate communication interface(s) is also contemplated, which is particularly advantageous for APs. The transceiver 101 may be implemented as a separate unit with serial or parallel connections, such as a Universal Serial Bus (USB) connection or an Ethernet interface (twisted-pair, coaxial cable, etc.), or any other suitable interface to the device. Other types of wireless devices are contemplated, such as any type of wireless telephony device including cellular phones.

The transceiver 101 communicates via the wireless medium using one or more antennas 103 coupled to an internal radio chip or device (radio) 105. The radio 105 generally converts between RF signals and Baseband signals and is coupled to a Baseband (BB) processor 107. Within the radio 105, an RF switch 117 selects either a transmission (TX) chain 115 for transmission or an RF chain 119 for reception of packets. The Baseband processor 107 is further coupled to a medium access control (MAC) device 109 that communicates with the associated communication device or system. Digital data sent from or received by the transceiver 101 is processed through the MAC 109. For transmission, the MAC 109 asserts digital data signals via a MAC interface (I/F) 111 to a TX processor 113, which formulates data into packets for transmission. The digital packet information is converted to analog signals using a digital to analog converter (DAC) (not shown) and processed by the TX chain 115 for converting the packets into RF signals suitable for transmission via the antenna 103. Although not explicitly shown, the TX chain 115 typically includes upconverters or mixers to convert a baseband analog signal into an intermediate frequency (IF) signal and to convert the IF signal to RF for transmission.

Figure 2:
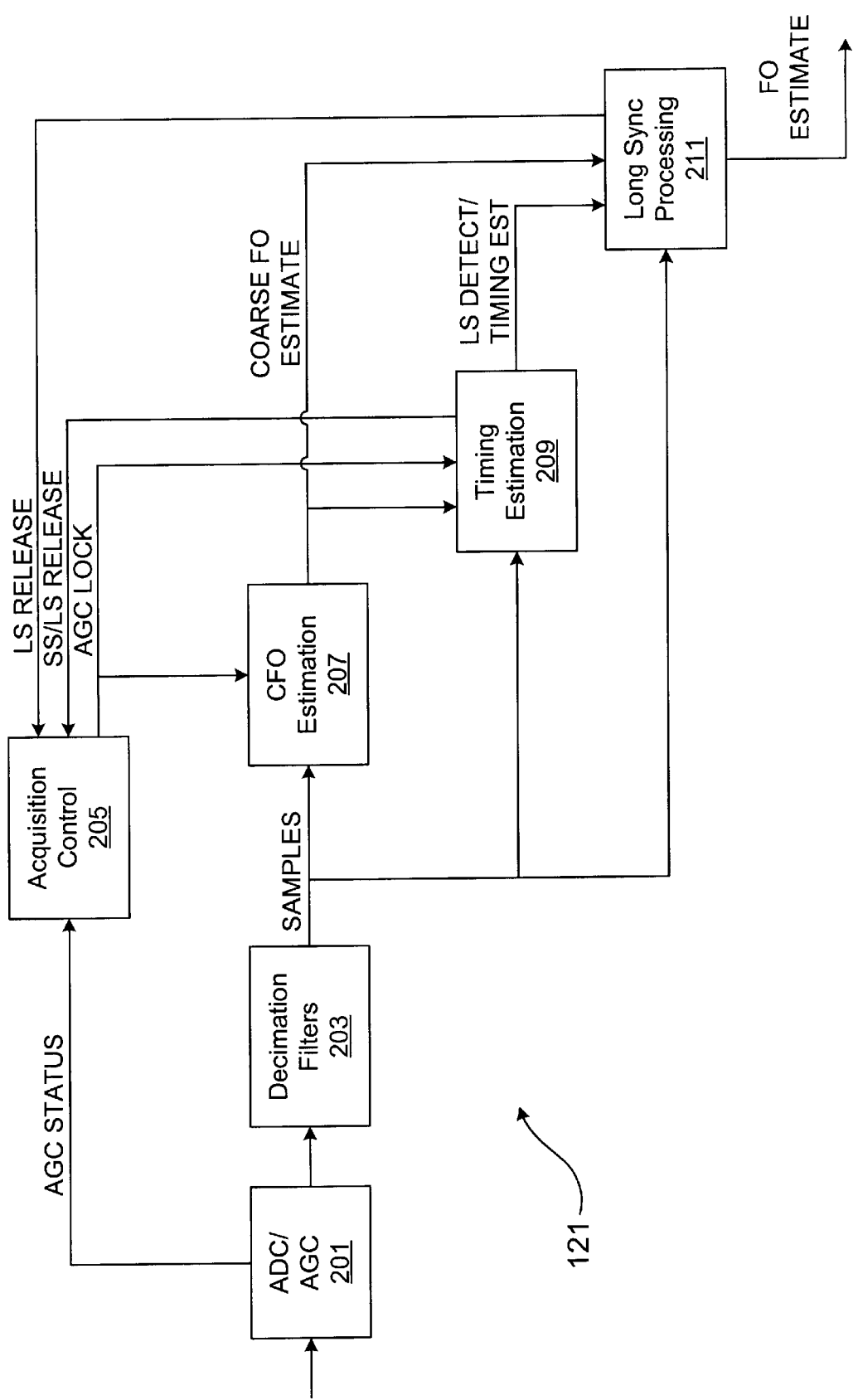
FIG. 2 is a block diagram illustrating a portion of the RX processor of FIG. 1 associated with initial acquisition of an incoming packet including AGC functions, course frequency offset (CFO) estimate and timing estimation for detecting the beginning of a long sync sequence of a packet.

For receive operations, the RX chain 119 extracts Baseband signals from a received RF signal and provides digital Baseband signals to a receive (RX) processor 121 via an analog to digital converter (ADC) 201 (FIG. 2). Although not explicitly shown, the RX chain 119 typically includes downconverters or mixers to convert from RF to IF and from IF to a baseband analog signal. The baseband analog signal is converted to digital format using the ADC. The RX processor 121 generally performs the inverse functions of the TX processor 113 to extract data from received packets into data signals for the associated communication device. The data is forwarded to the MAC 109 via the MAC I/F 111 as shown. Other functions are not shown, such as automatic gain control (AGC) functions or the like for amplifying or attenuating the received signal to a desired target power level.

The transceiver 101 may be implemented according to the Institute of Electrical and Electronics Engineers, Inc. (IEEE) 802.11a standard operating at approximately 5 Gigahertz (GHz) for use with a WLAN. The IEEE 802.11a standard defines data rates of 6, 9, 12, 18, 24, 36, 48 and 54 megabits per second (Mbps) in the 5 GHz band employing orthogonal frequency division multiplexing (OFDM). OFDM is a multi-carrier modulation technique in which data is carried on a plurality of "tones" or "sub-carriers" associated with a multi-carrier signal. In the OFDM embodiment, communication is established using packets of information including a one or more synchronization data fields followed by a plurality of OFDM symbols. In an OFDM configuration, 52 sub-carrier signals are incorporated within each OFDM symbol, including 48 data tones and 4 pilot tones as known to those skilled in the art. Data is incorporated on each data tone using a selected modulation scheme, such as binary phase shift keying (BPSK), Quadrature PSK (QPSK), 16 Quadrature Amplitude Modulation (QAM), and 64 QAM. Each of the modulation schemes employs a corresponding constellation with two, four, 16 or 64 constellation points, respectively. The data rate is determined by the modulation scheme used for data. For example, BPSK is used for 6 or 9 Mbps, QPSK is used for 12 or 18 Mbps, 16 QAM is used for 24 or 36 Mbps, and 64 QAM is used for 48 or 54 Mbps. It is appreciated, however, that the teachings of the present invention may be applied in the same or similar manner to other types of wireless communication in which data is transmitted using packets with pre-pended synchronization signals and communicated via a selected RF band, such as long sync signals provided in packet preambles.

Figure 4:
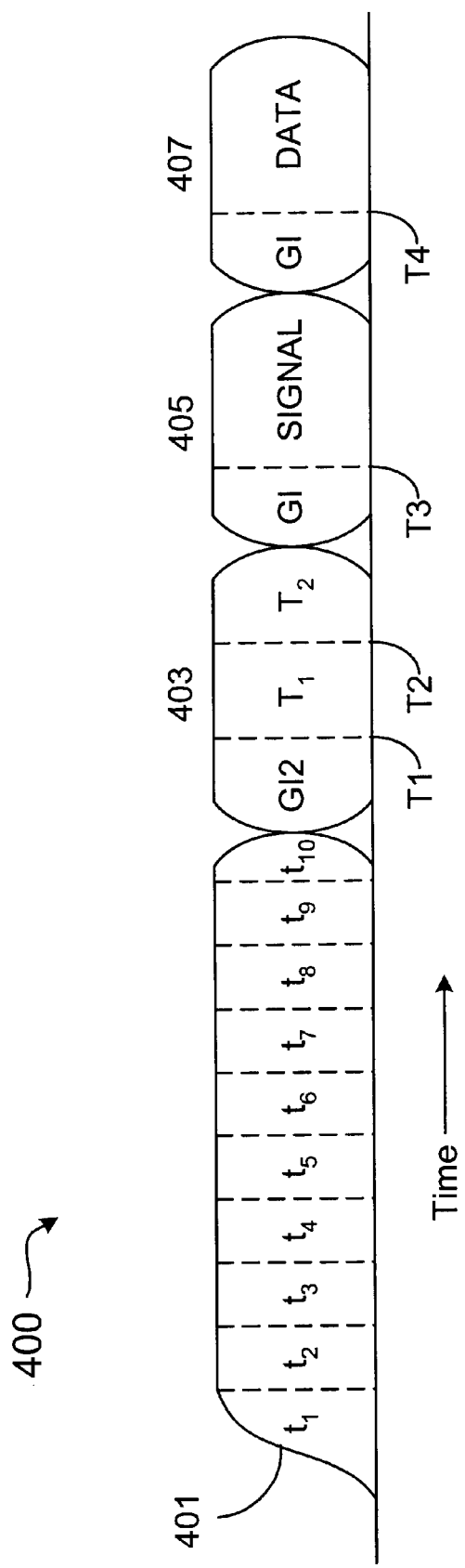

FIG. 4 is a timing diagram illustrating a preamble structure of an exemplary OFDM packet 400 configured according to IEEE 802.11a. It is noted that the present invention is not limited to OFDM or 802.11a and is applicable to any wireless communication employing packet-based communications using pre-pended synchronization signals. The packet 400 includes a short sync section 401 followed by a long sync section 403 followed by signal and data sections 405 and 407. The short sync section 401 includes a series of identical sequences at the beginning of the packet 400 used for signal detection, AGC settling, CFO estimation and symbol timing acquisition. In the configuration shown, the short sync sequences include 10 identical sequences or training symbols $t_x$, where the subscript "x" is an index from 1 to 10. Each short sync training symbol has a duration of 0.8 microseconds ($\mu$s) for a total short sync duration of approximately 0.8 $\mu$s. Each sequence comprises 16 samples at a 20 megahertz (MHz) sample rate and is constructed from Inverse Fast-Fourier Transform (IFFT) of 12 tones.

The long sync section 403 and the signal section 405 collectively form a preamble for the packet 400. The preamble is transmitted in approximately 12 $\mu$s. The long sync section 403 is 8 $\mu$s including a pair of 0.4 $\mu$s guard intervals (GI2) followed by a pair of 3.2 $\mu$s long training symbols $T_y$, where the subscript "y" is an index from 1 to 2. Another guard interval (GI) separates the long sync section 403 and the signal section 405, and yet another GI separates the signal section 405 from the data section 407. The long sync (LS) symbols $T_y$ are predetermined and thus known to both the transmitter and the receiver. As described further below, the receiver includes a correlator 301 (FIG. 3) that correlates (compares) incoming signals with the predetermined LS symbols and that outputs a correlation signal indicative thereof. For example, the greater the correlation between the incoming signals and the predetermined LS symbols, the larger the correlation output. The correlation signal is used to identify the start of the LS symbols, which are shown starting at times T1 and T2, respectively. Once the times T1 and T2 are determined, the start of the signal section 405 at a time T3 after the guard interval and the start of the data section 407 at a time T4 after another guard interval are determined.

FIG. 2 is a block diagram illustrating a portion of the RX processor 121 associated with initial acquisition of an incoming packet including AGC functions, course frequency offset (CFO) estimate and timing estimation for detecting the beginning of a long sync sequence of a packet, such as the exemplary packet 400. An analog baseband signal from the radio 105 is provided to an ADC/AGC block 201, which incorporates the ADC function to convert to digital format. The ADC/AGC 201 includes the AGC function, which controls the power level of the incoming signal and asserts corresponding AGC status signals to acquisition control logic 205. The digital signals from the ADC/AGC 201 are provided to decimation filters 203, which generates and provides digital sample signals (SAMPLES) at a selected sample rate to CFO estimation logic 207, to timing estimation logic 209, and to long sync processing logic 211. In one embodiment, the selected sample rate used by the decimation filters 203 is 20 MHz.

The ADC/AGC 201 indicates target power control to the acquisition control logic 205, which asserts an AGC LOCK signal to the CFO estimation logic 207 and the timing estimation logic 209. The CFO estimation logic 207 and the timing estimation logic 209 begin processing upon assertion of the AGC LOCK signal. The CFO estimation logic 207 determines a coarse estimate of frequency offset of the received signal based on the digital SAMPLES (compared with internal frequency based on internal oscillators) and asserts a COARSE FO ESTIMATE signal indicative thereof to the timing estimation logic 209 and the long sync processing logic 211. The timing estimation logic 209 receives the digital SAMPLES, detects and determines timing of the LS symbols and asserts an LS DETECT/TIMING EST (estimation) signal to the long sync processing logic 211. The long sync processing logic 211 receives the LS DETECT/TIMING EST signal and the digital SAMPLES and provides a more accurate frequency offset (FO) estimate and asserts an FO ESTIMATE signal indicative thereof. The timing estimation logic 209 may determine that there is no valid signal and send an SS/LS RELEASE message back to the acquisition control logic 205 to stop acquisition processing and listen for another AGC LOCK message. Similarly, the long sync processing logic 211 may determine that there is no valid signal and send an LS RELEASE message back to the acquisition control logic 205 to stop acquisition processing and listen for another AGC LOCK message.

Figure 3:
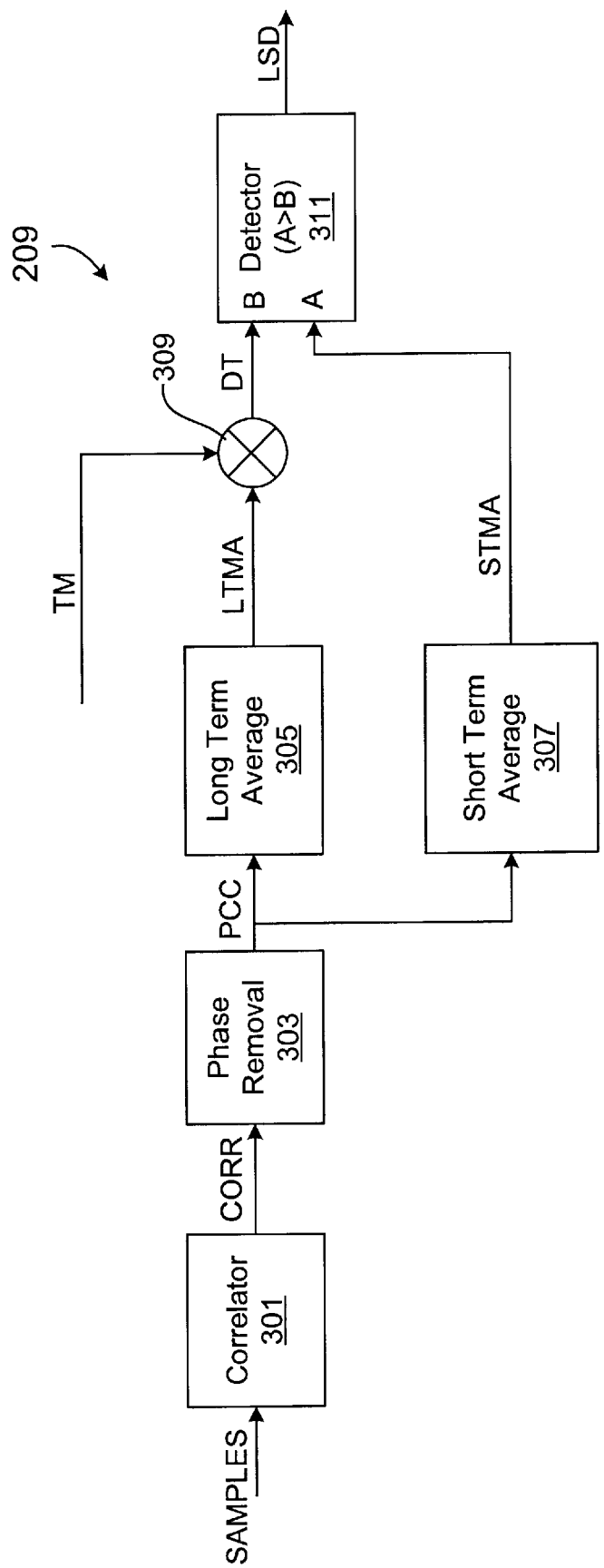
FIG. 3 is a block diagram of an exemplary embodiment of the timing estimation logic of FIG. 2 used to estimate the timing of the long sync symbols within the preamble of incoming signals.

FIG. 3 is a block diagram of an exemplary embodiment of the timing estimation logic 209 used to estimate the timing of the long sync symbols within the preamble of incoming signals, such as the exemplary packet 400. The digital SAMPLES are provided to an input of the correlator 301, which asserts a correlation signal (CORR) indicative thereof. The CORR signal is provided to the input of phase removal logic 303, which removes phase error of the CORR signal and provides a corresponding phase corrected CORR (PCC) signal to the respective inputs of long term average logic 305 and short term average logic 307. Since there are almost always phase errors present at the input of the correlator 301, the correlator 301 is rarely perfectly synchronized with the incoming signal. The phase removal logic 303 serves to remove any phase in the CORR signal. Any acceptable phase removal technique may be employed, such as squaring the complex signals, determining the magnitude, approximating the magnitude, etc. The timing of the sample average employed by the short term average logic 307 is based on assumed channel delay spread in a multipath environment, where the preamble correlation is spread over several output samples resulting in a corresponding multipath delay profile. The short term average logic 307 integrates (sums) over a selected number of samples and outputs a short term moving average (STMA) signal based on the last selected number of samples received. In one embodiment, the selected number of samples is approximately 4 to 12 samples, although the selected number may be different depending upon the particular application, configuration, or particular multipath delay profile. The STMA signal is provided to a first (A) input of a detector 311.

The long term average logic 305 operates in a similar manner as the short term average logic 307 except that it uses a larger number of samples for integration. In this manner, a larger number of digital SAMPLES are accumulated for a more stable and less responsive long term moving average (LTMA) signal. The number of samples selected used by the long term average logic 305 is significantly larger than the selected number of samples used by the short term average logic 307, so that the long term average logic 305 asserts a longer-term LTMA signal that generally tracks the noise floor or noise level of the wireless medium. In one embodiment, the selected number of samples used by the long term average logic 305 is greater than 20 samples, such as 32 samples, although the selected number may be different depending upon the particular application, configuration, particular noise level or multipath delay profile.

The LTMA signal is provided to one input of a multiplier 309, which receives a constant scale factor value "TM" at its other input. The multiplier 309 multiplies the LTMA signal by the scale factor TM, which is selected to provide a sufficient margin relative to the instantaneous noise level. The multiplier 309 asserts a dynamic threshold (DT) signal at its output, which is provided to a second (B) input of the detector 311. The detector 311 compares the A and B inputs and asserts a long sync detect (LSD) signal based on a crossover between the STMA and DT signals, such as when the STMA signal becomes greater than the DT signal.

Figures 5A, 5B:
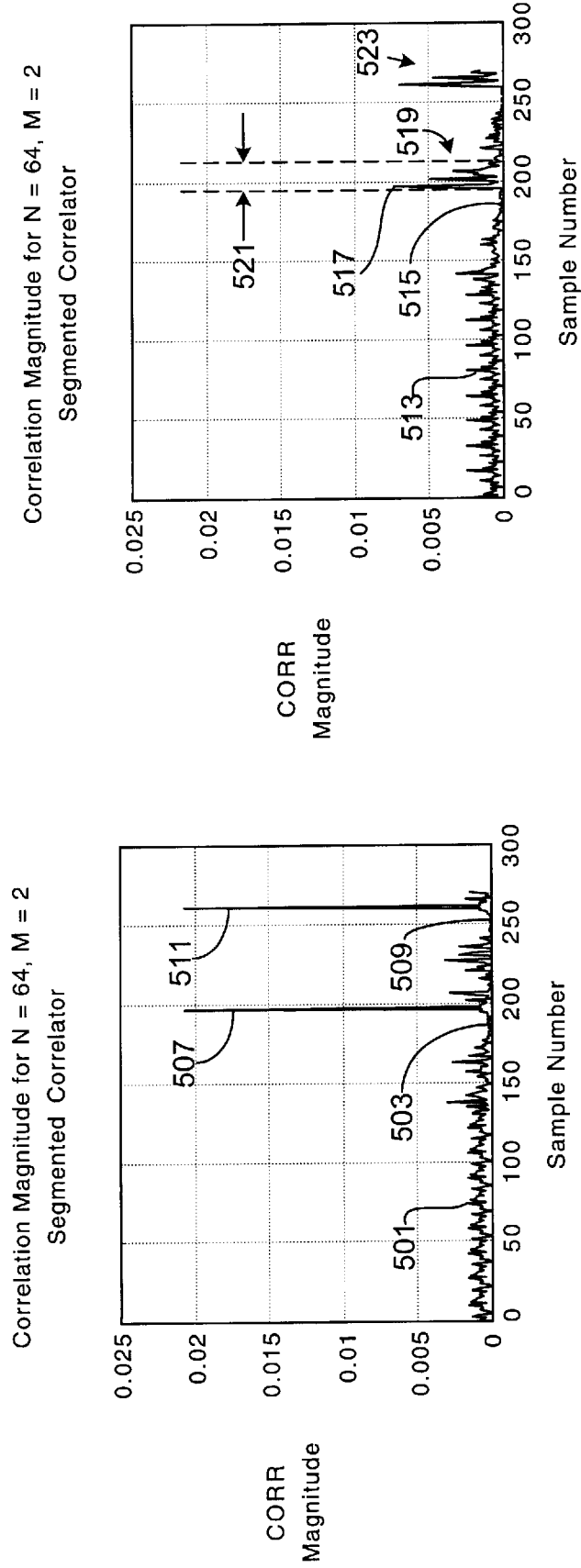
FIG. 5A is a graphic diagram plotting the magnitude of a correlation signal at the output of the correlator of FIG. 3 versus the sample number of digital samples in response to a transmitted packet in an ideal wireless medium exhibiting little or no multipath distortion.
FIG. 5B is a graphic diagram plotting the magnitude of a correlation signal at the output of the correlator of FIG. 3 versus the sample number of digital samples in response to a transmitted packet in an exemplary wireless medium exhibiting multipath distortion.

FIG. 5A is a graphic diagram plotting the magnitude of the CORR signal at the output of the correlator 301 versus the sample number of the digital SAMPLES in response to a transmitted packet in a clean or otherwise ideal wireless medium exhibiting little or no multipath distortion. The initial portion of the CORR signal shown at 501 for samples 0 to 150 or so illustrates the response of the correlator 301 to noise in the wireless channel prior to onset of the LS symbols, and represents a noise floor or noise level that stays well below a magnitude of 0.005. As the first LS symbol propagates into the correlator 301, initial correlation detection causes a drop of the CORR signal to almost zero as shown at 503 before the sample 200. Upon completion of correlation of the first LS symbol just prior to the sample 200, the correlator 301 outputs a large correlation peak shown at 507. After the first LS symbol, the second LS symbol begins propagating through the correlator 301 causing a subsequent drop near the sample 250 shown at 509 followed by another large correlation peak shown at 511.

FIG. 5B is a graphic diagram plotting the magnitude of the CORR signal at the output of the correlator 301 versus the sample number of the digital SAMPLES in response to a transmitted packet in an exemplary wireless medium exhibiting multipath distortion. The initial portion of the CORR signal shown at 513 for samples 0 to about 150 illustrates a similar response pattern as in the ideal case except that the noise peaks are somewhat pronounced due to the multipath distortion. The noise level still remains below magnitude 0.005. As the first LS symbol propagates into the correlator 301, initial correlation detection causes a drop of the CORR signal to almost zero as shown at 515 just prior to sample 200, which is similar to the drop in the ideal case shown at 503. Upon completion of correlation of the first LS symbol before the sample 200, the correlator 301 outputs a first attenuated correlation peak shown at 517. The correlator 301 then outputs a series of one or more consecutive correlation peaks with increasing attenuation (decay) as shown at 519. The CORR signal exhibits a multipath delay profile including the peaks 517, 519 during a time period shown at 521. The second LS symbol exhibits a similar multipath delay profile shown at 523. In effect, the energy of the LS symbols of the transmitted packet is distributed in time in the wireless medium due to multipath distortion causing the correlation peaks to be attenuated and distributed in time in a similar manner.

The detector 311 is tasked with the function of determining the timing of the LS symbols, and thus has to distinguish the series of correlation peaks 517, 519 relative to noise. Although the illustrated example appears to show attenuated yet larger peaks relative to noise suggesting that a hard threshold value might be successful (e.g., magnitude of 0.005), several factors mitigate against this approach. First, the noise level varies significantly with actual environmental conditions, and further varies over time depending upon existing interfering factors. For example, sudden activation of a communication device operating in a nearby frequency range in the same wireless area (e.g., portable phone) may cause the noise level to drown out the correlation peaks resulting in numerous false tripping of the detector 311 and/or failure of LS detection. The multipath distortion itself is variable and unpredictable so that the magnitude of the correlation peaks is likewise variable and unpredictable.

One possible technique to enhance the LS symbols is to integrate the output of the correlator 301 over an assumed channel delay spread. Such short-term integration tends to delay and enhance the size of the correlation peaks. The short-term integration technique includes an undesirable artifact, however, in that it also tends to enlarge the level of noise by about the same factor so that the correlation peaks would still be difficult to detect in a reliable manner using a single predetermined constant threshold. Furthermore, the AGC function of the ADC/AGC 201 typically exhibits errors that significantly impact performance. A positive or negative AGC error level of approximately 3 dB is expected (reducing peak by one-half or doubling noise level). Negative AGC errors reduce correlation peaks resulting in an increase in LS symbol detection failures. Positive AGC errors enhance the noise level and significantly increases false alarm events. Also, for OFDM embodiments, the OFDM preamble has poor cross-correlation properties resulting in increased false alarm events. All of these factors collectively contribute to reduced performance levels.

Figure 6:
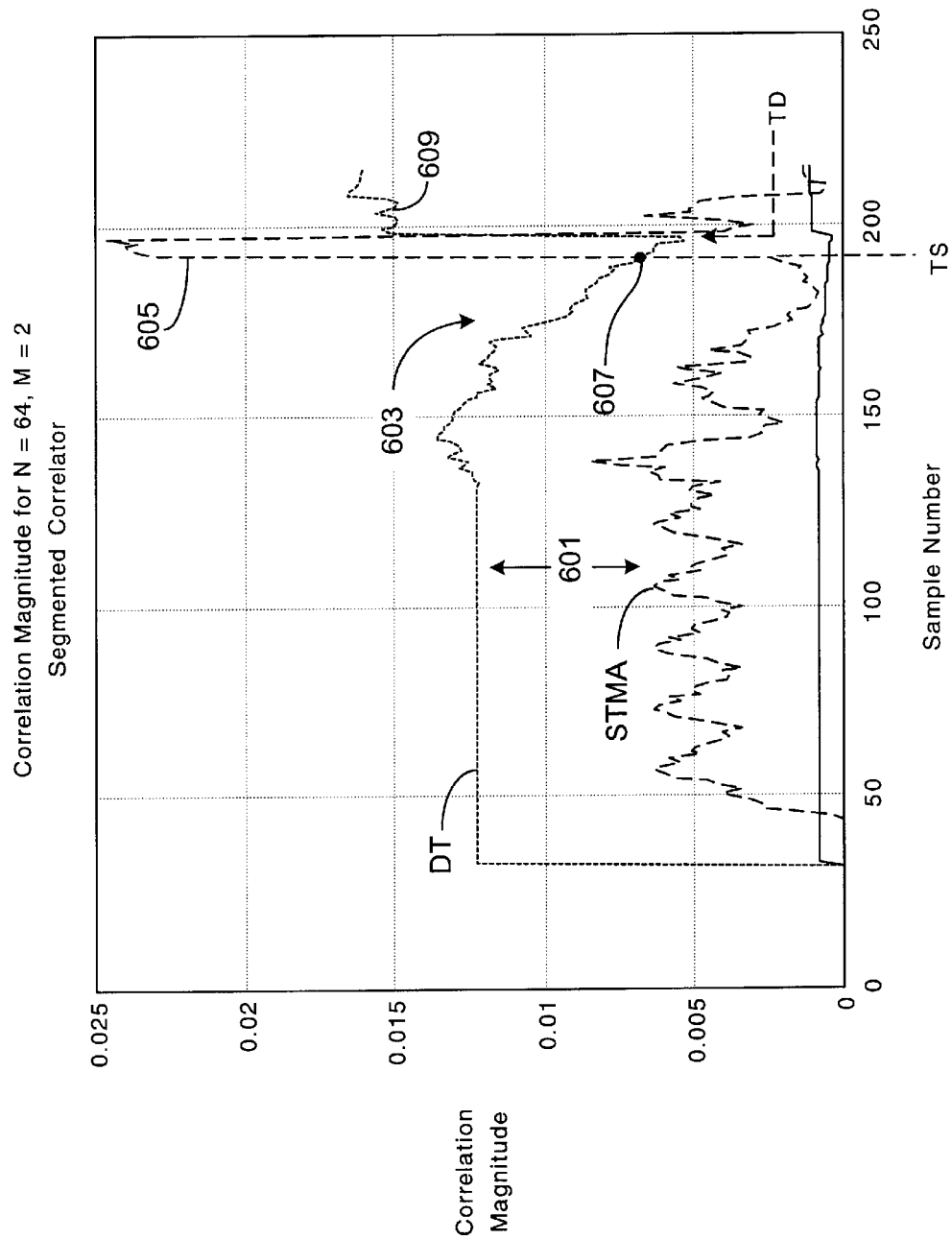
FIG. 6 is a graphic diagram plotting correlation magnitude versus sample number for both a dynamic threshold (DT) signal and a short-term moving average (STMA) signal provided to the inputs of the detector of FIG. 3.

FIG. 6 is a graphic diagram plotting correlation magnitude versus sample number for both the DT and STMA signals provided to the inputs of the detector 311. The DT signal is shown as a dotted line and the STMA signal is shown as a dashed line. The LTMA signal would normally track at about the same level as the STMA signal for noise signals in the channel. The TM scale factor, however, is used to raise the DT signal significantly above the STMA signal during the noise period as shown at 601. An exemplary value for the TM scale factor is 1.5, although any suitable scale factor may be employed depending upon the environment or application in which the transceiver 101 is employed. The DT and STMA signals both begin to decrease as shown at 603 when the correlator 301 begins processing the first LS symbol. The STMA signal exhibits a relatively sharp rise at a time TS resulting in a relatively large correlation peak 605. Meanwhile, the DT signal continues to decrease at time TS since the long term average logic 305 is slower to respond to the correlation increase. In this manner, the rise of the STMA signal sharply rises above the DT signal resulting in a crossover point at 607. The detector 311 responds to the crossover point 607 and asserts the LSD signal at the appropriate time reliably indicating onset of the LS symbol. Subsequently, at a time TD, the DT signal rises to a peak 609 in a delayed response to the correlation process.

It is appreciated that the cooperating functions between the long term average logic 305 and the short term average logic 307 and the multiplier 309 results in a consistent and reliable crossover event in response to LS correlation. The relatively large number of samples used for the longer-term integration results in less susceptibility to noise bursts. Although the STMA signal responds faster to noise bursts than the LTMA signal, the TM scale factor mitigates against a false alarm. The TM scale factor, therefore, creates an effective dynamic threshold at the time of LS correlation. The relatively small number of samples corresponding to the multipath delay profile used for shorter-term integration results in reliable detection of LS correlation relative to the dynamic threshold. The combined LS detection system used for LS timing estimation according to an embodiment of the present invention provides reliable LS detection and reduced false alarm occurrence resulting in substantial performance improvement for the transceiver 101.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention.

What is claimed is:

1. A threshold detector for a wireless receiver configured to detect synchronization signals of packets transmitted in a wireless medium, comprising:
 a correlator that compares received signals with predetermined synchronization signals and that provides a correlation signal indicative thereof;
 a short-term integrator, coupled to the correlator, that integrates a predetermined short term of the correlated signal and that provides a short term moving average signal;
 a long-term integrator, coupled to the correlator, that integrates a predetermined long term of the correlated signal and that provides a long term moving average signal;
 a multiplier, coupled to the long-term integrator, that multiplies the long term moving average signal by a predetermined constant and that provides a corresponding dynamic threshold signal; and
 a detector, coupled to the multiplier and the short-term integrator, that asserts a timing signal based on a crossover between the short term moving average signal and the dynamic threshold signal.

2. The threshold detector of claim 1, further comprising:
 a phase remover, coupled at the output of the correlator, that removes phase of the correlation signal.

3. The threshold detector of claim 1, wherein:
 the correlator outputs a consecutive series of samples at a selected sample rate of the received signal as the correlation signal;
 the short-term integrator determines a moving average using a first predetermined number of samples based on a predetermined channel delay spread; and
 the long-term integrator determines a moving average using a second predetermined number of samples, second predetermined number being greater than the first predetermined number and selected to track noise level in the channel.

4. The threshold detector of claim 3, wherein the first predetermined number is less than 10 and wherein the second predetermined number is greater than 20.

5. The threshold detector of claim 1, wherein the correlator is a matched filter correlator.

6. A baseband processor for a radio frequency (RF) communication device, comprising:
 an analog to digital converter (ADC) that converts received analog baseband signals to digital baseband signals;
 decimation filters, coupled to the ADC, that coverts the digital baseband signals to digital samples at a selected sample rate; and
 a synchronization timing estimator, coupled to the decimation filters, comprising:
  a correlator that compares the digital samples from the decimation filters with predetermined synchronization signals and that provides digital correlation samples indicative thereof;
  a short-term integrator, coupled to the correlator, that integrates a first predetermined number of the digital correlation samples and that provides a short term moving average signal;
  a long-term integrator, coupled to the correlator, that integrates a second predetermined number of the digital correlation samples and that provides a long term moving average signal, the second predetermined number greater than the first predetermined number;
  a multiplier, coupled to the long-term integrator, that multiplies the long term moving average signal by a predetermined scale factor and that provides a corresponding dynamic threshold signal; and
  a detector, coupled to the multiplier and the short-term integrator, that asserts a timing signal based on a crossover between the short term moving average signal and the dynamic threshold signal.

7. The baseband processor of claim 6, wherein the synchronization timing estimator further comprises a phase device coupled at the output of the correlator to remove phase of the digital correlation samples.

8. The baseband processor of claim 6, wherein the first predetermined number is based on a predetermined channel delay spread of a wireless medium and wherein the second predetermined number is selected to reflect average noise level in a wireless channel.

9. The baseband processor of claim 6, wherein the predetermined synchronization signals are long sync symbols of an orthogonal frequency division multiplexing (OFDM) packet.

10. The baseband processor of claim 9, further comprising:
 automatic gain control (AGC) logic, couple to the ADC, that that controls a power level of the digital signals to a target power level;
 acquisition control logic, coupled to the AGC logic, that asserts an AGC lock signal;
 course frequency offset estimation logic, coupled to the acquisition control logic, the decimation filters and the synchronization timing estimator, that asserts a course frequency offset estimate signal; and
 the synchronization timing estimator beginning processing upon assertion of the AGC lock signal and receiving the course frequency offset estimate signal.

11. A radio frequency (RF) transceiver configured for packet-based communication in which packets include prepended synchronization signals, comprising:
 a radio section configured to convert RF signals at a selected communication frequency received by an antenna into corresponding analog baseband signals; and
 a baseband processor, coupled to the radio, comprising:
  an analog to digital converter (ADC) that converts the analog baseband signals to digital signals;
  decimation filters, coupled to the ADC, that coverts the digital signals to digital samples at a selected sample rate; and
  timing estimation logic, coupled to the decimation filters, comprising:
   a correlator that compares the digital samples from the decimation filters with predetermined synchronization signals and that provides digital correlation samples indicative thereof;
   a short-term integrator, coupled to the phase corrector, that sums a first predetermined number of phase-corrected digital correlation samples and that provides a short term moving average signal;
   a long-term integrator, coupled to the phase corrector, that sums a second predetermined number of phase-corrected digital correlation samples and that provides a long term moving average signal, the second predetermined number greater than the first predetermined number;

a multiplier, coupled to the long-term integrator, that multiplies the long term moving average signal by a predetermined scale factor and that provides a corresponding dynamic threshold signal; and a detector, coupled to the multiplier and the short-term integrator, that asserts a long sync timing signal based on a crossover between the short term moving average signal and the dynamic threshold signal.

12. The RF transceiver of claim 11, further comprising a phase remover, coupled to the correlator, that removes phase of the digital correlation samples.

13. The RF transceiver of claim 11, wherein the packet-based communication is compatible with orthogonal frequency division multiplexing (OFDM).

14. The RF transceiver of claim 11, further comprising:

the radio section converting RF signals to intermediate frequency (IF) signals and converting IF signals to the analog baseband signals;

the baseband processor further comprising:

automatic gain control (AGC) logic, coupled to the ADC, that controls a power level of the digital signals to a target power level; and frequency offset logic, coupled to the decimation filters and the timing estimation logic, that estimates frequency offset of the digital samples.

15. A method of detecting synchronization signals of a packet transmitted in a multipath wireless medium, comprising:

correlating an incoming signal with predetermined synchronization signals and providing a correlation signal indicative thereof;

integrating the correlation signal over a predetermined short duration and providing a short-term moving average signal;

integrating the correlation signal over a predetermined long duration and providing a long-term moving average signal;

multiplying the long-term moving average signal by a scale factor and providing a corresponding dynamic threshold; and detecting a cross-over event between the short-term moving average signal and the dynamic threshold and asserting a timing signal indicative thereof.

16. The method of claim 15, further comprising removing phase of the correlation signal.

17. The method of claim 15, further comprising:

generating discrete samples of the incoming signal at a predetermined sample rate;

said correlating comprising comparing the discrete samples with predetermined samples and providing correlation samples indicative thereof;

said integrating the correlation signal over a predetermined short duration comprising averaging a first predetermined number of correlation samples; and said integrating the correlation signal over a predetermined long duration comprising averaging a second predetermined number of correlation samples, wherein the second predetermined number is greater than the first predetermined number.

18. The method of claim 17, wherein said generating discrete samples comprises converting an analog signal to a digital signal and sampling the digital signal at the predetermined sample rate.

19. The method of claim 17, wherein said comparing the discrete samples with predetermined samples comprises comparing the discrete samples with predetermined long sync symbols.

20. The method of claim 15, wherein the predetermined short duration is based on a predetermined multipath delay spread and wherein the predetermined long duration is selected to track noise in a wireless medium.

* * * * *